United States Patent
Tanda et al.

(10) Patent No.: US 11,495,403 B2
(45) Date of Patent: Nov. 8, 2022

(54) IGNITION COIL FOR INTERNAL COMBUSTION ENGINE AND PRODUCTION METHOD FOR THE SAME

(71) Applicant: DIAMOND & ZEBRA ELECTRIC MFG. CO., LTD., Osaka (JP)

(72) Inventors: Junichi Tanda, Osaka (JP); Michinori Matsuda, Osaka (JP); Hiroshi Oshiumi, Osaka (JP)

(73) Assignee: DIAMOND&ZEBRA ELECTRIC MFG. CO., LTD., Osaka (JP)

( * ) Notice: Subject to any disclaimer, the term of this patent is extended or adjusted under 35 U.S.C. 154(b) by 176 days.

(21) Appl. No.: 16/980,593

(22) PCT Filed: Apr. 11, 2019

(86) PCT No.: PCT/JP2019/015788
§ 371 (c)(1),
(2) Date: Sep. 14, 2020

(87) PCT Pub. No.: WO2019/235062
PCT Pub. Date: Dec. 12, 2019

(65) Prior Publication Data
US 2021/0057150 A1    Feb. 25, 2021

(30) Foreign Application Priority Data

Jun. 5, 2018 (JP) .............................. JP2018-107450

(51) Int. Cl.
*H01F 41/04*    (2006.01)
*B23K 26/324*    (2014.01)
(Continued)

(52) U.S. Cl.
CPC ........... *H01F 41/04* (2013.01); *B23K 26/244* (2015.10); *B23K 26/324* (2013.01); *F02P 3/02* (2013.01);
(Continued)

(58) Field of Classification Search
CPC ....... H01F 41/04; H01F 38/12; B23K 26/244; B23K 26/206; B23K 26/21; B23K 26/22; B23K 26/24; B60K 26/324; F02P 3/02
See application file for complete search history.

(56) References Cited

U.S. PATENT DOCUMENTS

2009/0324977 A1* 12/2009 Sakata .................... C08L 67/02
525/437

FOREIGN PATENT DOCUMENTS

| JP | 2002-184630 A | 6/2002 |
| JP | 2014-207289 A | 10/2014 |

(Continued)

OTHER PUBLICATIONS

International Search Report, issued in PCT/JP2019/015788, dated Jun. 25, 2013.
(Continued)

*Primary Examiner* — Jacob M Amick
(74) *Attorney, Agent, or Firm* — Birch, Stewart, Kolasch & Birch, LLP

(57) ABSTRACT

An ignition coil includes a not-illustrated coil, a plate assembly, and a case assembly. The plate assembly and the case assembly are combined with each other by laser welding at a recess and a rib (projection) which are respective abutting portions, thereby forming storage spaces for storing the coil.

6 Claims, 7 Drawing Sheets

(51) Int. Cl.
    *B23K 26/244*     (2014.01)
    *F02P 3/02*     (2006.01)
    *H01F 38/12*     (2006.01)
    *B23K 103/00*     (2006.01)
    *B23K 101/36*     (2006.01)
    *B29C 45/14*     (2006.01)
    *B29K 67/00*     (2006.01)
    *B29K 105/00*     (2006.01)
    *B29L 31/34*     (2006.01)

(52) U.S. Cl.
    CPC .......... *H01F 38/12* (2013.01); *B23K 2101/36* (2018.08); *B23K 2103/42* (2018.08); *B29C 45/14639* (2013.01); *B29K 2067/006* (2013.01); *B29K 2105/0032* (2013.01); *B29L 2031/34* (2013.01)

(56) References Cited

FOREIGN PATENT DOCUMENTS

| JP | 2014-212223 A | | 11/2014 |
| JP | 2014212223 A | * | 11/2014 |
| JP | 2015-90871 A | | 5/2015 |

OTHER PUBLICATIONS

Japanese Office Action, issued in the corresponding Patent Application No. 2018-107450, dated Feb. 12, 2019.

Nakamura et al., "Resin Welding by Semiconductor Laser", Journal of Japan Welding Society, Japan, General Incorporated Association Japan Welding Society, Apr. 5, 2003, vol. 72, No. 3, pp. 29-32.

Sato, "Plastic Joining Method", Journal of Japan Welding Society, Japan, General Incorporated Association Japan Welding Society, Oct. 2009, vol. 78, No. 7, p. 40-.44.

* cited by examiner

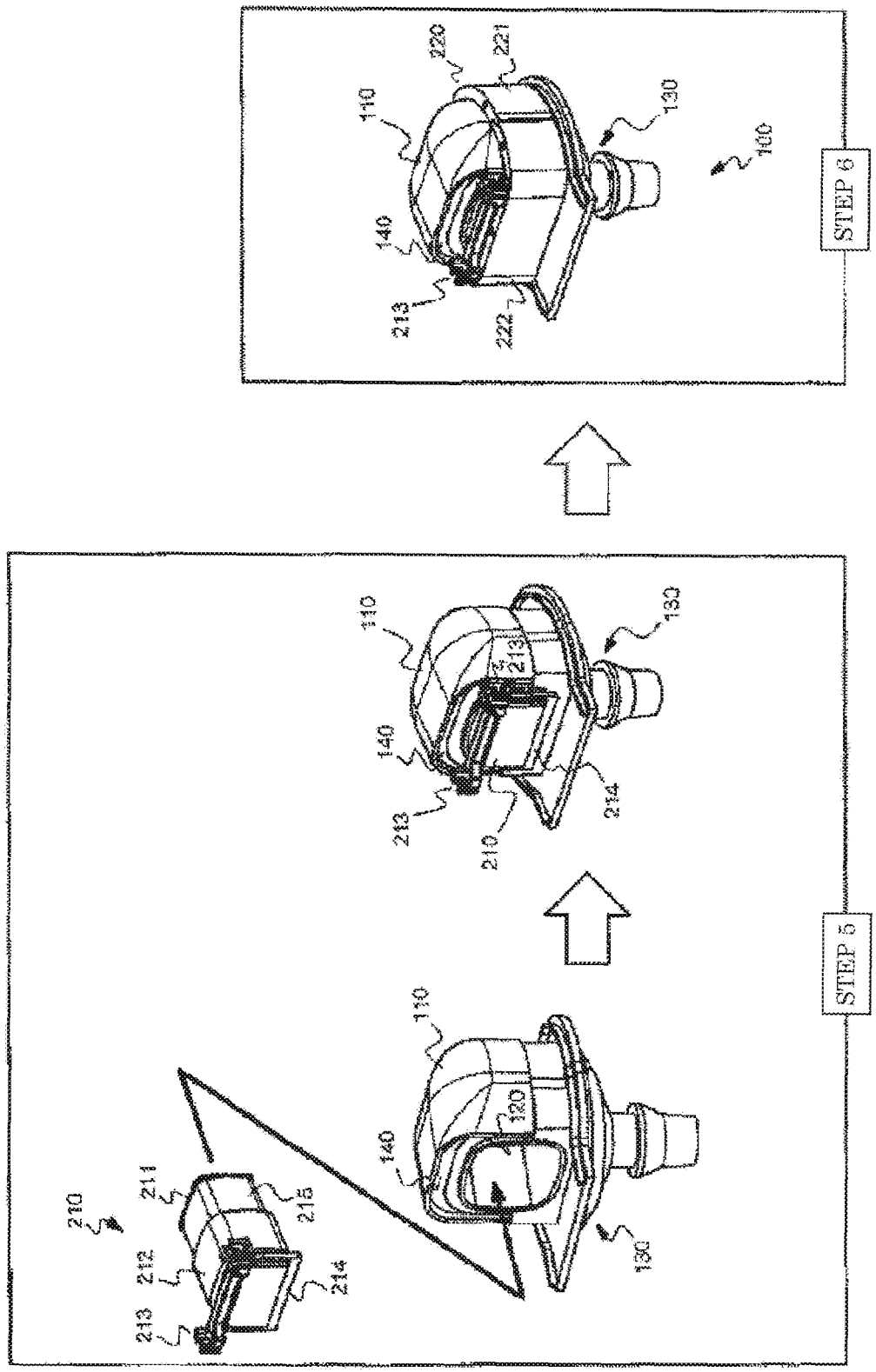

IGNITION COIL FOR INTERNAL COMBUSTION ENGINE AND PRODUCTION METHOD FOR THE SAME

TECHNICAL FIELD

The present invention relates to ignition coils for internal combustion engines and a production method for the same. Particularly, the present invention relates to improvement of ignition coils, for internal combustion engines, each having a structure in which a coil is stored in a case and a gap between the coil and the case is filled with insulating resin.

BACKGROUND ART

As is well known, a plug hole is formed in an engine block or an engine cover in an internal combustion engine, and a spark plug is disposed at the bottom portion of the plug hole and an ignition coil is disposed above the spark plug such that the spark plug and the ignition coil are electrically connected to each other.

The ignition coil includes a plurality of components as disclosed in, for example, Patent Literature 1 as a publication for the invention of the inventors of the present invention. The components typically include a case (for example, made of synthetic resin such as PBT) and a coil assembly which is stored in the case and which has a function as a transformer (voltage transforming function, a function as a voltage booster in general). The coil assembly typically includes a primary coil and a secondary coil. These two coils are sometimes enclosed, in the case, by an outer peripheral core (iron core, core).

In some examples of this type of ignition coil, the case is assembled by joining a plurality of parts to each other. Specifically, Patent Literature 1 describes some examples of the ignition coils suggested by the inventors of the present invention (hereinafter, referred to as "suggestion examples").

In the suggestion examples, the ignition coil includes a coil assembly, and a case assembly having a storage space in which the coil assembly is stored. In the case assembly, two parts that are a first partial case and a second partial case are joined to each other to form the storage space, and the case assembly is completed through the combining work.

CITATION LIST

Patent Literature

Patent Literature 1: JP2014-207289

SUMMARY OF THE INVENTION

Problems to be Solved by the Invention

The inventors of the present invention have made various researches and developments for the ignition coils according to the suggestion examples. As a result, the inventors of the present invention have found that there is room, in the ignition coil, for simultaneous achievement of improvement and stabilization of the quality of a part joining portion and shortening of time for combining work through improvement of a method for joining the two partial cases.

An object of the present invention is to provide an ignition coil, for an internal combustion engine, which allows improvement and stabilization of the quality of a part joining portion and shortening of time for combining work to be simultaneously achieved with ease based on the above-described findings.

Solution to the Problems

In order to achieve the object, one aspect of the present invention is directed to an ignition coil, for an internal combustion engine, which includes a coil and a case for storing the coil. In the ignition coil, the case is formed in a state where the case is divided into a plurality of portions, the portions are joined to each other and thus combined by laser welding, a storage space for the coil is formed in the case by the combination, the coil is stored in the storage space, and insulating resin is filled and hardened in the case in the storage state.

Specifically, some exemplary embodiments are implemented as described below.

(1) An ignition coil for an internal combustion engine, the ignition coil including:
  a coil assembly; and
  a case assembly having a storage space in which the coil assembly is stored, the storage space formed by combining a first partial case and a second partial case each of which is formed of synthetic resin, in which
  the first partial case and the second partial case are joined to each other at a laser welded portion formed by applying laser light to a contact portion at which each of the partial cases abuts with the other of the partial cases, and
  insulating resin is filled between the case assembly and the coil assembly in the storage space.

In the ignition coil, a hollow structure (for example, enclosing body) that defines the storage space for the coil assembly is divided into at least two parts in order to, for example, make the ignition coil compact (minimize an unnecessary gap between an internal component and the case). For example, the hollow structure is vertically divided along the longitudinal axis direction or divided along the direction perpendicular to the longitudinal axis direction. The parts are resin-molded in a state where the parts are separated from each other. Thereafter, the molded products are joined to each other by laser welding, thereby forming the storage space.

In the laser welding, laser light (for example, laser beam having a diameter that is sufficient and non-excessive relative to the size of a target portion) is applied only to target portions (portions at which the joining portion is finally formed) of the two parts to be joined to each other in a stationary state with high accuracy for the targets without vibrating the two parts. Thus, only the target portions are heated and the surface of each part is locally melted.

As a result, in the laser welding, the material is easily inhibited from being unnecessarily melted and deformed on each cross-section of the laser welded portion between the two parts. Furthermore, in laser welding, the surfaces of the parts are uniformly melted also on each cross-section of the laser welded portion. Therefore, the cross-sectional characteristics of the laser welded portion become uniform, resulting in stabilization of the material characteristics (for example, strength and the like) of the laser welded portion.

In the ignition coil, laser light may be transmitted through the first partial case and absorbed by the second partial case, or, in contrast, laser light may be transmitted through the second partial case and absorbed by the first partial case.

In the description herein, "a gap is not substantially formed between the case assembly and the coil assembly" refers to both a case where a gap is not formed at all between the case assembly and the coil assembly and a case where a gap is formed therebetween but the gap has such a size that the influence of the gap on the function of the ignition coil is little.

(2) In the ignition coil, for an internal combustion engine, according to aspect (1), the case assembly has an exposed opening, the insulating resin is injected through the opening into the storage space, and the insulating resin filled in the storage space is hardened and then partially exposed at the opening.

In the description herein, the "exposed opening" refers to an opening that is formed in the case assembly such that the opening is positioned so as to be physically accessed from the outside of the case assembly. The opening is typically formed in the case assembly so as to penetrate through the outer frame or the outer wall portion of the case assembly.

(3) In the ignition coil, for an internal combustion engine, according to aspect (2), the opening is disposed so as to extend over both the first partial case and the second partial case.

Instead thereof, the entirety of the opening may be formed solely by one of the two partial cases. However, as described above, in a case where the opening is formed so as to extend over the two partial cases, the opening is divided into two parts, and, consequently, for example, the individual form structure of each partial case can be expected to be easily simplified.

(4) In the ignition coil, for an internal combustion engine, according to aspect (2) or (3), the opening has a closed peripheral edge, and the peripheral edge is formed in conjunction with the first partial case, the second partial case, and the laser welded portion.

(5) In the ignition coil, for an internal combustion engine, according to aspect (4), the first partial case has a first peripheral edge that extends along one imaginary plane and is not closed, the second partial case has a second peripheral edge that extends along one imaginary plane and is not closed, and the first partial case and the second partial case are joined to each other by laser welding in a state where the first peripheral edge and the second peripheral edge are in contact with each other.

(6) In the ignition coil, for an internal combustion engine, according to aspect (5), the opening is oriented in almost the same direction as a reference direction parallel to both the imaginary planes of the first peripheral edge and the second peripheral edge.

(7) In the ignition coil, for an internal combustion engine, according to aspect (6), the case assembly has a connector for electrically connecting the coil assembly to outside, and the opening is disposed between the connector and the laser welded portion when the ignition coil for an internal combustion engine is viewed in the reference direction.

(8) In the ignition coil, for an internal combustion engine, according to any one of aspects (1) to (7), at least one of the first partial case and the second partial case is almost cup-shaped, the first and the second partial cases abut with each other at a position at an opening end of the cup-shaped partial case, to form the storage space, and the laser welded portion is formed at the abutting portion.

(9) In the ignition coil, for an internal combustion engine, according to any one of aspects (1) to (8), the laser welded portion is formed as a continuous line on which a welded region is continuous.

(10) In the ignition coil, for an internal combustion engine, according to any one of aspects (1) to (8), the laser welded portion is formed as an intermittent line on which welded regions and non-welded regions alternate.

each non-welded region maintains an air gap which has been originally formed between a surface of the first partial case and a surface of the second partial case since the partial cases have been joined to each other, and the air gap has such a size and/or a shape as to act as a degassing portion that allows gas in the storage space or the insulating resin to pass therethrough but does not allow the insulating resin to pass therethrough when the insulating resin is injected from outside into the storage space.

In the ignition coil, the first partial case and the second partial case that define the storage space for the coil assembly in conjunction with each other, abut with each other, and the laser welded portion is formed at the abutting portion.

In a case where, as in aspect (9), the laser welded portion is formed as a continuous line on which the welded region is continuous, when the insulating resin is injected from outside into the storage space, gas that has been originally in the storage space or the insulating resin is not discharged through the laser welded portion.

Meanwhile, in the ignition coil, the laser welded portion is formed as an intermittent line on which the welded regions and the non-welded regions alternate, and each non-welded region maintains an air gap (gap between parts) that has been originally formed between the surface of the first partial case and the surface of the second partial case since the partial cases have abutted with each other.

The size and/or the shape of the air gap is optimized so as to allow gas in the storage space or the insulating resin to pass through the air gap and so as not to allow the insulating resin to pass through the air gap, when the insulating resin is injected from outside into the storage space. That is, the air gap can be caused to act as a degassing portion.

Accordingly, the air gap prevents degradation of the characteristics of the insulating resin due to gas remaining in the hardened insulating resin in the storage space.

In the description herein, it should be understood that "gas in the storage space or the insulating resin" does not necessarily mean that gas is always present in the storage space or the insulating resin, and also means that gas is present therein in some cases and gas is absent therein in other cases.

(11) In the ignition coil, for an internal combustion engine, according to any one of aspects (1) to (10), the contact portion is formed as a recess-projection fitting portion by a recess formed in one of the first and the second partial cases and a rib formed in the other thereof, and a ratio W/φ obtained by dividing a width dimension W of the rib by a beam diameter φ of the laser light is not greater than 0.7.

(12) An ignition coil for an internal combustion engine, the ignition coil including:

a coil assembly; and a case assembly having a storage space in which the coil assembly is stored, the storage space formed by combining a first partial case and a second partial case each of which is formed of synthetic resin, in which the first partial case includes a cup-shaped portion, and a plate-like flange portion that extends outward from a peripheral edge of the cup-shaped portion along one imaginary plane that is almost perpendicular to a center line of the cup-shaped portion, the second partial case includes a side wall portion having an end face that is abutted with the plate-like flange portion, the first partial case has a laser light transmittance higher than that of the second partial case, and/or the second partial case has a laser light absorptivity higher than that of the first partial case, laser light is applied to a joining portion at which the plate-like flange portion of the first partial case and the side wall portion of the second partial case are joined to each other such that the laser light is substantially transmitted through the first partial case and is substantially absorbed by the second partial case, and a laser welded portion is thus formed at the joining portion, and at least a part of the laser welded portion is disposed radially outward of an outer surface of the cup-shaped portion when the cup-shaped portion is viewed in the center line direction.

In the ignition coil, the position of the light path for the laser light can be relatively freely selected without placing a great focus on positional relationship of the outer surface of the cup-shaped portion of the first partial case relative to the laser welded portion to be formed.

(13) In the ignition coil, for an internal combustion engine, according to aspect (12), the entirety of the laser welded portion is positioned radially outward of the outer surface of the cup-shaped portion when the cup-shaped portion is viewed in the center line direction.

(14) In the ignition coil, for an internal combustion engine, according to aspect (13), the cup-shaped portion has the plate-like flange portion on one side on the center line such that the cup-shaped portion is integrated with the plate-like flange portion, and the cup-shaped portion has an opening for an internal terminal on the other side, and the outer surface of the cup-shaped portion is disposed radially inward of an outer peripheral edge of the plate-like flange portion when the first partial case is viewed in the direction of the center line of the cup-shaped portion.

In the ignition coil, the position of the light path for the laser light can be relatively freely selected without placing a great focus on the positional relationship of the outer surface of the cup-shaped portion of the first partial case relative to the outer peripheral edge of the plate-like flange portion. Therefore, the position of a target portion at which the laser welded portion is to be formed, on the end face of the plate-like flange portion, can also be relatively freely selected.

(15) In the ignition coil, for an internal combustion engine, according to any one of aspects (12) to (14), the cup-shaped portion has an almost conical shape or pyramidal shape.

(16) In the ignition coil, for an internal combustion engine, according to any one of aspects (12) to (15), one of a projection and a recess that fit each other is formed at a portion, of the plate-like flange portion, with which the end face of the side wall portion abuts, and the other of the projection and the recess that fit each other is formed at a portion, of the end face of the side wall portion, with which the plate-like flange portion abuts, so that the plate-like flange portion and the end face of the side wall portion are joined to each other at a recess-projection fitting portion, and the laser light is applied to the recess-projection fitting portion so as to be substantially transmitted through the first partial case and is substantially absorbed by the second partial case, and the laser welded portion is thus formed at the recess-projection fitting portion.

(21) An ignition coil for an internal combustion engine, the ignition coil including:

a coil assembly;

a first partial case that is formed of synthetic resin, and has a body portion and a plate-like flange portion that extends radially outward of the body portion; and a second partial case that is formed of synthetic resin, and forms a storage space for the coil assembly in conjunction with the first partial case in a state where the second partial case is joined to the first partial case, in which the second partial case is almost cup-shaped and has a side wall portion, the side wall portion abuts with an outer flat surface of the plate-like flange portion at an end face of the side wall portion so as to be almost perpendicular to the outer flat surface, one of the end face of the side wall portion and the outer flat surface of the plate-like flange portion has one of a projection and a recess that fit each other, and the other of the end face of the side wall portion and the outer flat surface of the plate-like flange portion has the other of the projection and the recess that fit each other, and the side wall portion and the plate-like flange portion are joined to each other by laser welding by applying laser light to at least one of the projection and the recess having been formed.

(22) In the ignition coil, for an internal combustion engine, according to aspect (21), the projection is formed along an outer peripheral edge of the plate-like flange portion.

(23) In the ignition coil, for an internal combustion engine, according to aspect (21), the recess is formed along an outer peripheral edge of the plate-like flange portion.

(31) An ignition coil for an internal combustion engine, the ignition coil including:

a coil assembly;

a first partial case formed of synthetic resin; and a second partial case that is formed of synthetic resin, and that forms a storage space for the coil assembly in conjunction with the first partial case in a state where the second partial case is joined to the first partial case, in which the synthetic resin that forms the first partial case has a brightness higher than the synthetic resin that forms the second partial case.

In general, a material of a partial case that acts as a laser light transmitting material among the first and the second partial cases may have a brightness (for example, closer to white color) higher than a material of the other partial case that acts as the laser light absorber. However, difference in laser light transmittance may be achieved by physical properties of a material other than color. In this case, the object can be achieved even in a case where both the materials of the two partial cases are black and difference in brightness therebetween is little.

(32) In the ignition coil, for an internal combustion engine, according to aspect (31), laser light is incident, through the first partial case, on a joining portion between the first partial case and the second partial case, and thereafter absorbed by the second partial case, and a laser welded portion is thus formed in the joining portion.

A production method according to the present invention includes: a step A of disposing a primary coil and a secondary coil on a plate assembly to form a coil assembly; a step B of forming a case cover assembly having an internal space; a step C of welding the case cover assembly to the coil assembly by application of laser light so as to store the primary coil and the secondary coil in the internal space; and a step D of injecting insulating resin into the case cover assembly and the coil assembly welded to each other and hardening the insulating resin.

Preferably, in the step C, the laser light is applied so as to be substantially transmitted through the plate assembly and substantially absorbed by the case cover assembly.

Preferably, in the step C, laser is applied such that portions which are welded by application of laser light and portions to which the laser light is not applied alternate in a joining portion between the case cover assembly and the coil assembly.

Preferably, an air gap that allows gas to pass therethrough but does not allow the insulating resin to pass therethrough is provided in the joining portion between the case cover assembly and the coil assembly.

An ignition coil according to the present invention includes: a primary coil; a secondary coil; a plate assembly having a plate-like flange portion at which the primary coil and the secondary coil are disposed; and a case cover assembly that has an internal space for storing the primary coil and the secondary coil, the case cover assembly configured to be welded to the plate assembly. The plate assembly is formed of synthetic resin, and the plate assembly is formed of the synthetic resin having a laser light absorptivity lower than that of the case cover assembly.

Preferably, a material of the plate assembly is PBT, and a material of the case cover assembly is a material in which a pigment containing a carbon material is added to PBT.

BRIEF DESCRIPTION OF THE DRAWINGS

FIG. 2 is a perspective view of a plurality of steps of combining a primary coil and outer peripheral cores with the secondary coil assembly shown in FIG. 1 to assemble a coil assembly.

DESCRIPTION OF EMBODIMENTS

Figure 3A:
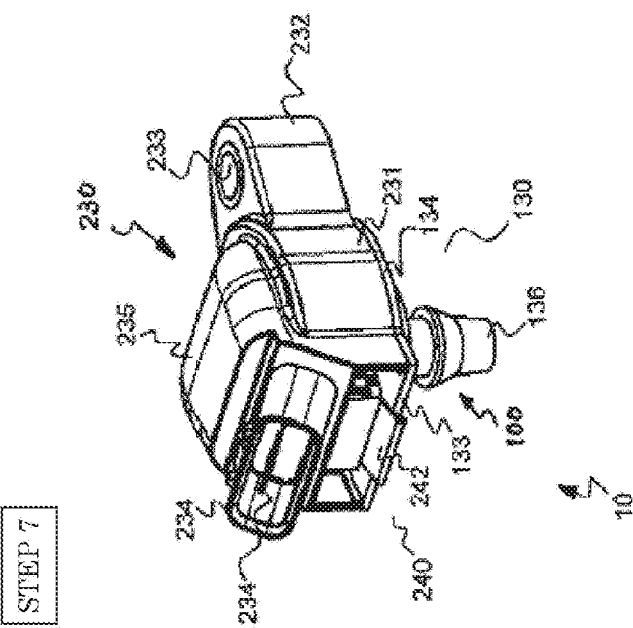
FIG. 3A is a lower part perspective view of an internal structure of a case cover assembly in the ignition coil, for an internal combustion engine, shown in FIG. 1.
Figure 3B:
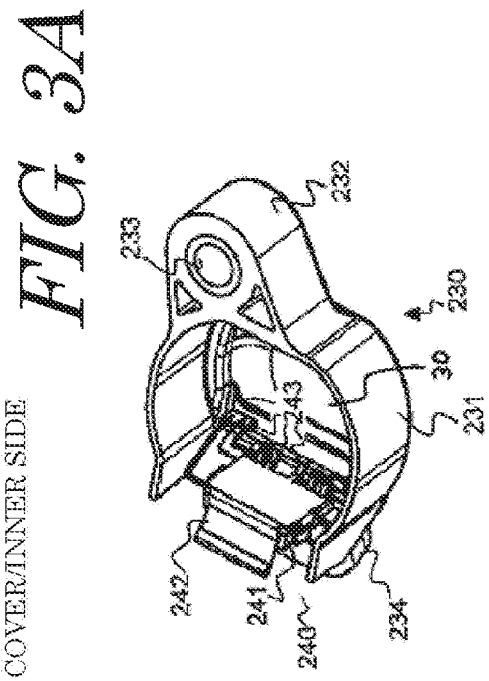
FIG. 3B is an upper part perspective view of an external structure of the case cover assembly.
Figure 3C:
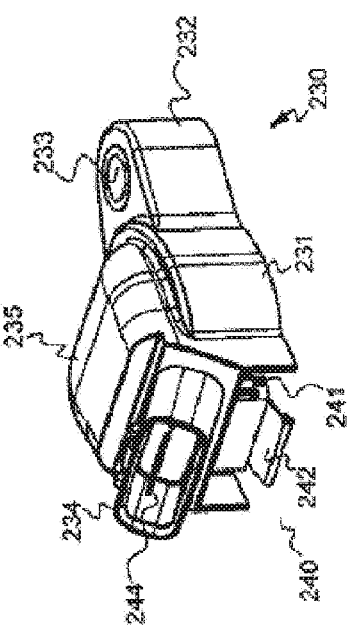
FIG. 3C is an upper part perspective view of the entire structure of the ignition coil, for an internal combustion engine, which has been completed by combining the coil assembly shown in FIG. 2 with the case cover assembly.

FIG. 3C is a perspective view of the entire structure of an ignition coil 10 for an internal combustion engine (hereinafter, simply referred to as "ignition coil") according to one embodiment of the present invention.

<Outline Description>

Firstly, the ignition coil 10 will be schematically described. The ignition coil 10 includes a coil assembly 100 shown in FIG. 2 and a case cover assembly 230 shown in FIG. 3A and FIG. 3B. The coil assembly 100 and the case cover assembly 230 are separately assembled, and are then joined to each other, thereby almost completing the ignition coil 10 (semifinished product). Thereafter, insulating resin (thermosetting) is injected into the ignition coil 10 and hardened, thereby fully completing the ignition coil 10 (finished product). Each of the coil assembly 100 and the case cover assembly 230 is mainly formed of a resin molded product.

In the present embodiment, as described below in detail with reference to FIG. 5 to FIG. 8, in a state where the coil assembly 100 and the case cover assembly 230 are combined with each other, laser light is applied to a joining portion at which the coil assembly 100 and the case cover assembly 230 are joined to each other by a recess and a projection fitting each other such that the laser light is substantially transmitted through a plate assembly 130 in the coil assembly 100 and is substantially absorbed by the case cover assembly 230.

Thus, the case cover assembly 230 is locally heated, and the heat having been thus generated is locally transmitted from the case cover assembly 230 to the plate assembly 130. Thus, the case cover assembly 230 and the plate assembly 130 are locally melted almost simultaneously. Thus, a laser welded portion is formed at the joining portion. Accordingly, the plate assembly 130 and the case cover assembly 230 are firmly combined with each other.

<Coil Assembly 100>

Figure 1:
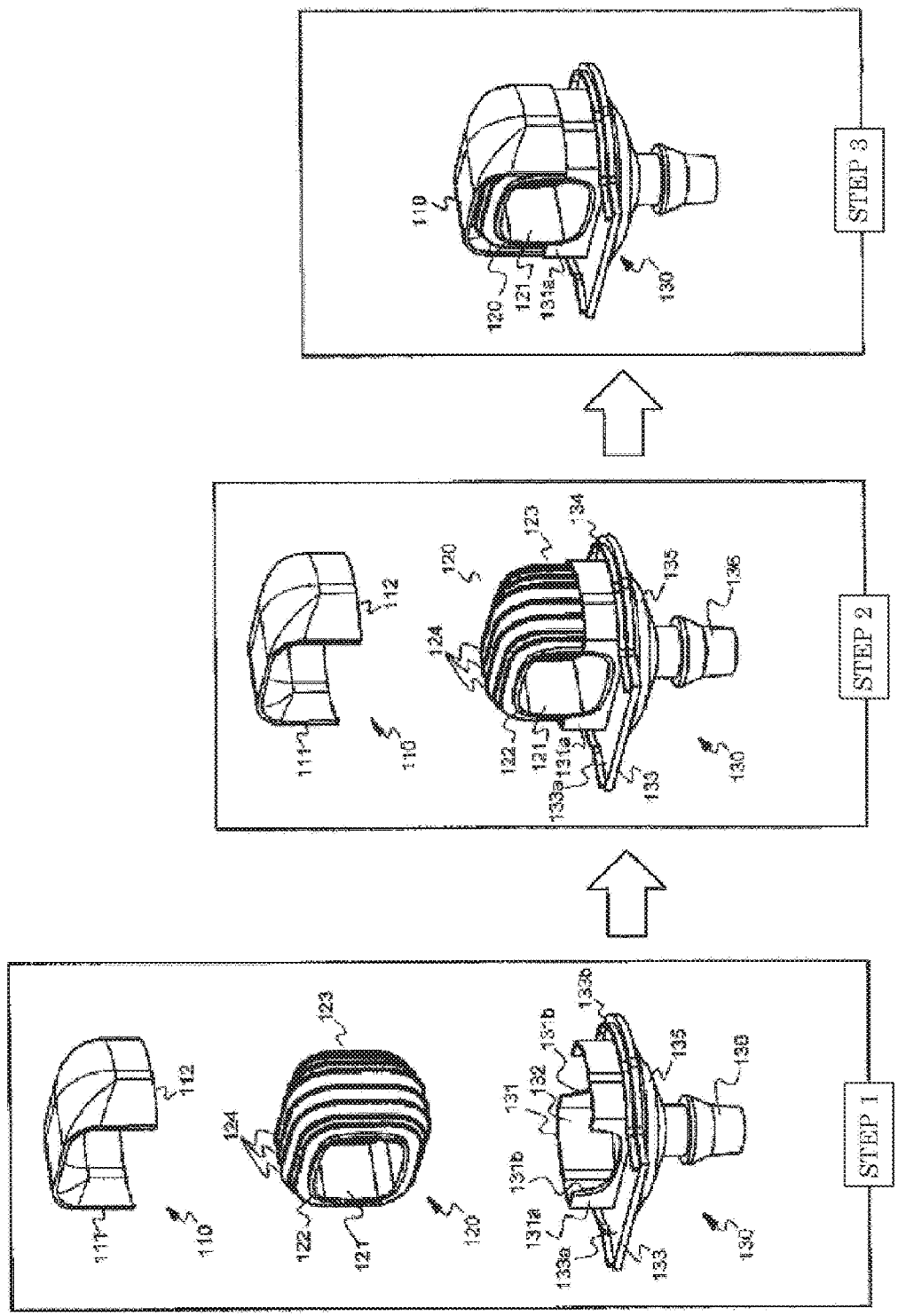
FIG. 1 is a perspective view of a plurality of steps of assembling a secondary coil assembly in an ignition coil, for an internal combustion engine, according to an exemplary embodiment of the present invention.

Next, the structure and assembling method for the coil assembly 100 will be specifically described firstly with reference to FIG. 1 to FIG. 3.

FIG. 2 illustrates the finally assembled state of the coil assembly 100 on the rightmost side. The coil assembly 100 mainly includes a partial cap 110 shown in FIG. 1, a secondary coil 120 shown in FIG. 1, the plate assembly 130 shown in FIG. 1, a primary coil 210 shown in FIG. 2, and outer peripheral cores 221, 222 shown in FIG. 2.

The plate assembly 130 represents an example of "first partial case" in each of the above-described aspects, and the case cover assembly 230 represents an example of "second partial case" in each of the above-described aspects. In the present embodiment, the plate assembly 130 and the case cover assembly 230 are joined to each other by laser welding, whereby an example of the "case assembly" in each of the above-described aspects is structured.

In the present embodiment, an example of the "coil assembly" in each of the above-described aspects is structured by the secondary coil 120 and the primary coil 210 that is inserted in the secondary coil 120.

As shown in FIG. 1, the plate assembly 130 is a resin molded product and includes a partial cap 131, a plate-like flange portion 133, and a cup-shaped portion 135 that is formed in a thin cap-like shape (for example, a thin semiconical shape) in an integral manner. Throughout the entire description, the term "cup-shaped" refers to a hollow structure having one end closed and the other end opened.

In the present embodiment, the partial cap 131 is integrated with the plate assembly 130. However, the partial cap 110 may be integrated with the partial cap 131 to form, that is, a complete cap 110 instead of the partial cap 110 without providing the partial cap 131 in the plate assembly 130, and the complete cap 110 may be combined with the plate assembly 130.

The cup-shaped portion 136 has an opening 135 for an internal terminal (secondary high voltage terminal, which is not shown) in an integral manner. The opening 136 extends coaxially with the cup-shaped portion 136. The internal terminal is stored in the opening 136 so as to be accessed from the outside. The internal terminal is used in a state where the internal terminal is electrically connected to a not-illustrated spark plug (for example, by using a conductive spring), to apply, to the spark plug, high voltage (boosted voltage) generated in the secondary coil 120 by electromagnetic induction due to the primary coil 210.

As a material of each component of the ignition coil 10, the partial cap 110 and the plate assembly 130 are each formed of an insulating synthetic resin (for example, thermoplastic resin such as PPE and PBT). Similarly, the case cover assembly 230 is also formed of an insulating synthetic resin (for example, thermoplastic resin such as PPE and PBT).

However, the plate assembly 130 is formed of a synthetic resin which has a laser light transmittance higher than that of the case cover assembly 230 and has a laser light absorptivity lower than that of the case cover assembly 230 such that the plate assembly 130 is suitable for the above-described laser welding.

For example, in the present embodiment, the material of the plate assembly 130 may have a brightness lower than that of the case cover assembly 230 (for example, the plate assembly 130 may have a black-colored material) in a case where the material of the plate assembly 130 has a laser light transmittance higher than that of the case cover assembly 230.

In the present embodiment, for example, the plate assembly 130 and the case cover assembly 230 are similar in that their materials are PBT. However, a pigment is not added at all to the PBT that is the material of the plate assembly 130 as a laser light transmitting material, and the PBT of the plate assembly 130 has a creamy color or a white color as a natural color, whereas a pigment that contains a carbon material is added to the PBT that is the material of the case cover assembly 230 as a laser light absorber, so that the PBT of the case cover assembly 230 has a black color, that is, a color having a brightness lower than that of the material of the plate assembly 130.

In the present embodiment, difference in laser light transmittance and difference in laser light absorptivity are achieved between the plate assembly 130 and the case cover assembly 230 due to the difference in brightness. However, difference in laser light transmittance and difference in laser light absorptivity can be achieved even when there is no difference in brightness (for example, both of them have black colors) in a case where kinds of the materials themselves are made different between the plate assembly 130 and the case cover assembly 230.

As shown in FIG. 1, the partial cap 131 is integrated with the partial cap 110 described above in a state where the secondary coil 120 is stored in an internal space 132 of the partial cap 131, and, thus, an enclosing body in which the secondary coil 120 is enclosed from the outer peripheral side is formed. The partial cap 131 and the partial cap 110 are joined to each other by using, for example, heat-welding, ultrasonic welding, an adhesive, or laser welding.

The partial cap 131 has a combination of a lid portion 131a and a cut portion 131b on each of both sides on the axis of the secondary coil 120. The lid portions 131a on both the sides allow the secondary coil 120 to be positioned in the internal space 132, and the secondary coil 120 is partially exposed from the cut portions 131b, 131b on both the sides.

As shown in FIG. 1, the cup-shaped portion 135 has an almost conical shape, and has rotational symmetry with respect to the center line. The cup-shaped portion 135 has a peripheral edge, and the peripheral edge extends along one imaginary plane that is perpendicular to the center line. The plate-like flange portion 133 extends radially outward from the peripheral edge of the cup-shaped portion 135 along the imaginary plane. The cup-shaped portion (example of "body portion" in each of the above-described aspects) 135 projects from the imaginary plane toward the center line, so that the cup-shaped portion 135 has thereinside a mortar-shaped space having a height dimension less than the bottom diameter dimension.

As shown in FIG. 1, a surface (end face that is joined to the end face of the case cover assembly 230, and hereinafter, referred to as "outer surface".), among the both surfaces of the plate-like flange portion 133, on the side on which the cup-shaped portion 135 is not provided includes a non-joining region 133a at which the plate assembly 130 is not joined to the case cover assembly 230 and a joining region 133b at which the plate assembly 130 is joined to the case cover assembly 230 in a state where the plate assembly 130 and the case cover assembly 230 are combined with each other.

As shown in FIG. 1, the joining region 133b extends on the outer surface of the plate-like flange portion 133 at a position near the outer peripheral edge of the plate-like flange portion 133 along the outer peripheral edge.

Figure 4A:
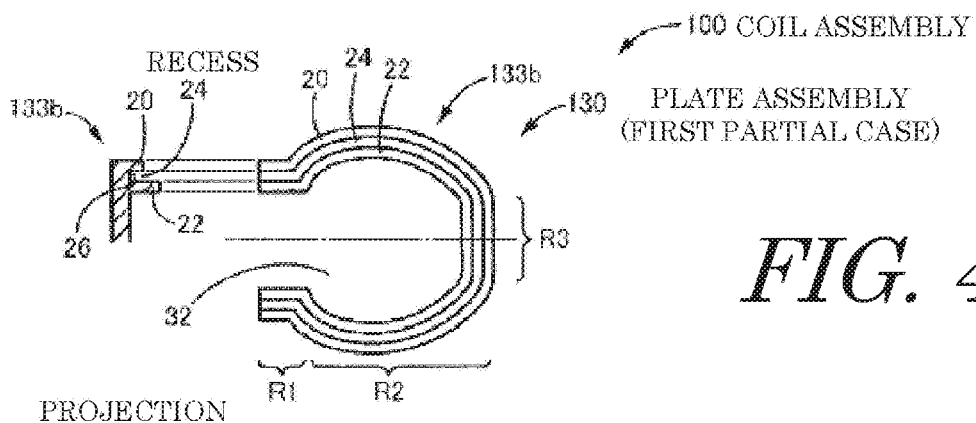
FIG. 4A illustrates an end face of the coil assembly shown in FIG. 2 as viewed from the upper side in FIG. 2 and also illustrates a partial cross-section of the end face of the coil assembly.

The joining region 133b will be specifically described. As shown in FIG. 4A, the joining region 133b is almost C-shaped or U-shaped in a planar view. Specifically, the joining region 133b has a pair of straight line portions R1, R1 that are parallel to each other, a pair of curved line portions R2, R2 that project in opposite directions, and one straight line portion R3 that connects between one end portions of the curved line portions R2, R2, in the planar view of the plate-like flange portion 133 shown in FIG. 1.

The joining region 133b extends in the peripheral direction with a uniform cross-sectional profile on the same plane. The cross-sectional profile includes an outer rib 20 having a flat and horizontal top face (that is, parallel to the flat face of the plate-like flange portion 133), an inner rib 22 having a flat and horizontal top face, and a recess (for example, one or more grooves) 24 located at a mid-portion therebetween, as shown in FIG. 4A.

The outer rib 20 has a height (distance from the reference face REF that is the flat face, on the opposite side, of the plate-like flange portion 133) that is less than that of the inner rib 22. The recess 24 has a flat and horizontal bottom surface 26.

Figure 5:
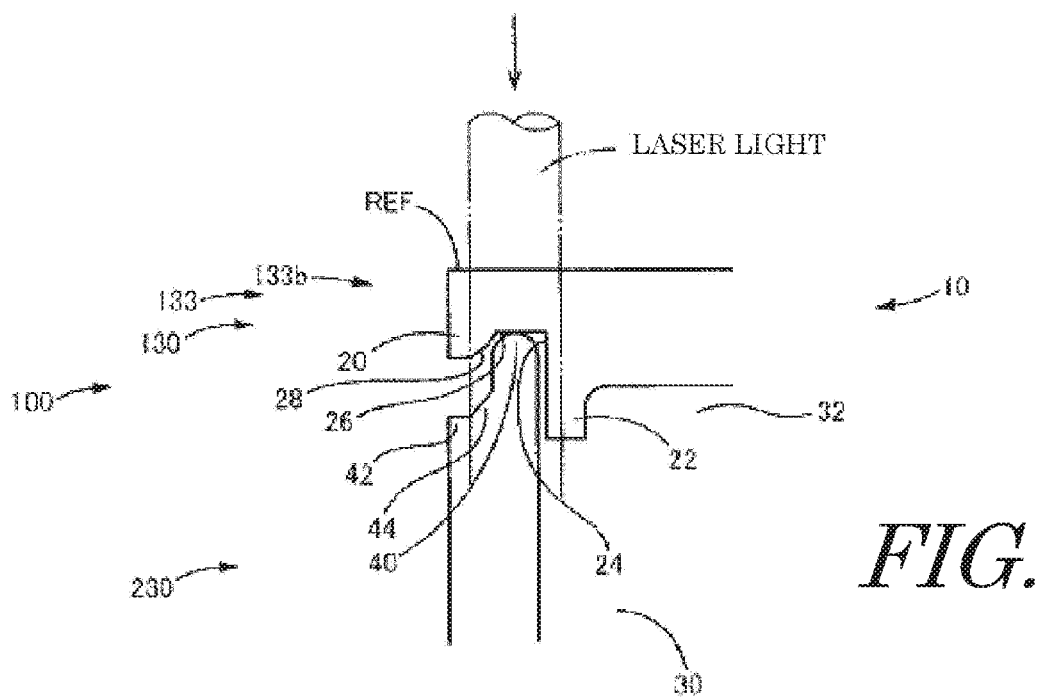
FIG. 5 is an enlarged partial cross-sectional view of laser welding performed in a state where a recess in the end face of the coil assembly shown in FIG. 4A and a projection on the end face of the case cover assembly shown in FIG. 4B fit each other.

FIG. 5 illustrates a cross-sectional structure of the joining region 133b in an enlarged manner as compared with FIG. 4A. As shown in FIG. 5, in the present embodiment, the recess 24 has a tilted surface 28 to transition between the bottom surface 26 and the top face of the outer rib 20. The tilted surface 28 has a projecting cross-sectional profile. Instead thereof, the tilted surface 28 may have, for example, a recessed cross-sectional profile, or have a flat cross-sectional profile.

The outer surface of the cup-shaped portion 135 is tapered as viewed from the side thereof such that, for example, the farther the outer surface of the cup-shaped portion 135 is from the outer surface of the plate-like flange portion 133 in the direction perpendicular to the outer surface of the plate-like flange portion 133, the less the diameter thereof is, and the outer surface of the cup-shaped portion 135 forms an almost conical surface.

At least a part (the entire portion in the present embodiment) of the joining region 133b (an example of "laser welded portion" in each of the above-described aspects) is disposed radially outward of the outer surface of the cup-shaped portion 135 as viewed from the side of the cup-shaped portion 135 and in a planar view.

The outer surface of the cup-shaped portion 135 is disposed radially inward of the outer peripheral edge of the plate-like flange portion 133 as viewed from the side and in a planar view.

As shown in FIG. 1, the secondary coil 120 is formed such that secondary winding (for example, copper wire) is wound around an insulating bobbin 122 having a through hole 121 for inserting a primary coil. The bobbin 122 has a pair of annular end walls (end flanges) 123, 123 located at both axial end portions, and a plurality of section walls (intermediate flanges) 124 that are coaxially aligned between the end walls 123, 123 so as to form gaps. The secondary winding is wound in a plurality of section grooves formed by the pair of the end walls 123, 123 and the plurality of the section walls 124.

The method for assembling the coil assembly 100 will be specifically described. As shown in FIG. 1, in step 1, the plate assembly 130, the secondary coil 120, and the partial cap 110 are firstly prepared. Next, in step 2, the secondary coil 120 is placed on the plate assembly 130. Subsequently, in this state, the exposed portion of the secondary coil 120 is covered with the partial cap 110 in step 3. Thus, the secondary coil assembly is completed.

Thereafter, as shown in FIG. 2, in step 5 (step 4 is not provided for convenience of description), the primary coil 210 is inserted in the through hole 121 of the secondary coil 120 in the secondary coil assembly. The primary coil 210 includes a center iron core 211 that is I-shaped in a planar view, a first portion 212 and a second portion 215 of primary winding, and a terminal frame 214 disposed at one end of the first portion 212.

Subsequently, in step 6, the outer peripheral cores 221, 222 are placed on the outer surface of the plate-like flange portion 133 in the plate assembly 130 so as to enclose the partial caps 110, 131, and accordingly enclose the secondary coil 120. Thus, the coil assembly 100 is completed.

<Case Cover Assembly 230>

Next, the structure of the case cover assembly 230 will be described with reference to FIG. 3.

As shown in FIG. 3A and FIG. 3B, the case cover assembly (in the drawings, simply referred to as "cover".) 230 is a resin molded product, and includes a body portion (cylindrical portion with a lid) 231, a mounting flange portion 232, and a connector 234 in an integral manner. FIG. 3A mainly illustrates an internal structure of the case cover assembly 230 and FIG. 3B mainly illustrates an external structure of the case cover assembly 230.

The connector 234 may not necessarily be integrated with the case cover assembly 230. Specifically, for example, the connector 234 may be formed separately from the case cover assembly 230, and the connector 234 as the separate component may be attached to the coil assembly 100 after the coil assembly 100 has been separately assembled, and, in this state, the case cover assembly 230 may be combined with the coil assembly 100.

The body portion 231 is a portion, of the case cover assembly 230, which engages with the coil assembly 100, as shown in FIG. 3C. The body portion 231 is almost cup-shaped. Specifically, the body portion 231 includes a peripheral wall portion (for example, a hollow structure that has an almost uniform cross-section and extends substantially in a straight manner, example of "side wall portion" in each of the above-described aspects), a closing portion (lid portion, projecting cap) 235, and an opening (air opening) 240.

One of both ends of the peripheral wall portion is closed by the closing portion 235 that is almost plate-shaped, whereas the other of the ends is opened as a single part but is closed when the coil assembly 100 is attached to the portion during the combination. As a result, a closed internal space 30 (see FIG. 4B) is formed in the peripheral wall portion.

The primary coil 210, the secondary coil 120, and the outer peripheral iron cores 221, 222 of the coil assembly 100 are stored in the internal space 30. The primary coil 210, the secondary coil 120, and the outer peripheral cores 221, 222 are also stored in an internal space 32 (see FIG. 4A. In particular, space inside the cup-shaped portion 135) of the coil assembly 100. Therefore, in the present embodiment, the two internal spaces 30 and 32 are combined with each other by joining the coil assembly 100 and the case cover assembly 230 to each other. The combined internal space is an example of "storage space" in each of the above-described aspects.

In the present embodiment, the closing portion 235 has a plate-like shape such that the center portion of the closing portion 235 locally projects outward. The projecting portion (projection) has such a shape as to complement a portion, of the coil assembly 100, which most greatly projects relative to the case cover assembly 230 in a state where the coil assembly 100 is combined with the case cover assembly 230, that is, complement the upper end portion of the partial cap 110. Therefore, the upper end portion is tightly stored without an unnecessary gap.

Consequently, a coil storage function required for the case cover assembly 230 is achieved while the height dimension of the peripheral wall portion is reduced and the size and the weight of the case cover assembly 230 are reduced as much as possible. That is, a coil that is relatively large relative to the height dimension of the peripheral wall portion can be stored in the ignition coil 10. Therefore, the ignition coil 10 is structured and designed to be compact such that an unnecessary internal space is minimized.

In the peripheral wall portion, the mounting flange portion 232 projects radially outward from a position in the peripheral direction. The peripheral wall portion has the opening 240 at another position in the peripheral direction.

The mounting flange portion 232 has a through hole in order to fixedly mount the ignition coil 10 to, for example, an engine block or a head cover of a not-illustrated internal combustion engine, and a metal bush 233 is disposed in the through hole by insert molding. A not-illustrated bolt is inserted in the metal bush 233, and the mounting flange portion 232 is fastened to the internal combustion engine by the bolt. The through hole extends in a direction that is almost parallel to the center line of the cup-shaped portion 135, as shown in FIG. 3C.

The connector 234 has a plurality of terminals 244. The terminals 244 include a power supply terminal, a ground terminal, a signal terminal, and the like.

The case cover assembly 230 further includes an igniter 241 for performing on/off control of a primary current that flows through the primary coil 210 and a grounding plate 242 at positions of the opening 240.

Before the laser welding, as shown in FIG. 3C, the case cover assembly 230 is positioned and mounted on the coil assembly 100. At this time, the end face (hereinafter, referred to as "cover end face".) of the case cover assembly 230 is brought into contact with the joining region 133b on the outer surface of the plate-like flange portion 133 of the plate assembly 130 in the coil assembly 100.

FIG. 3A illustrates the cover end face that faces upward. The cover end face is formed as one end face of the peripheral wall portion of the body portion 231 having the peripheral wall portion.

The cover end face and the joining region 133b (see FIG. 4A) of the plate-like flange portion 133 have shapes that are common to each other. Specifically, the cover end face is almost C-shaped or U-shaped in a planar view.

Figure 4B:
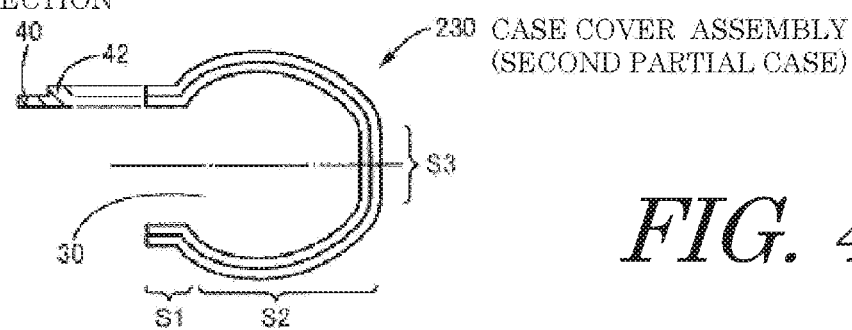
FIG. 4B illustrates an end face of the case cover assembly shown in FIG. 3B as viewed from the lower side in FIG. 3B and a partial cross-section of the end face of the case cover assembly.

More specifically, as shown in FIG. 4B, the cover end face includes a pair of straight line portions S1, S1 that are parallel to each other, a pair of curved line portions S2, S2 that project in opposite directions, and one straight line portion S3 that connects between one end portions of the curved line portions S2, S2. When the cover end face is joined to the joining region 133b of the plate-like flange portion 133, the pair of straight line portions S1, S1, the pair of curved line portions S2, S2, and the straight line portion S3 of the cover end face engage with the pair of straight line portions R1, R1, the pair of curved line portions R2, R2, and the straight line portion R3, respectively, of the joining region 133b.

As shown in FIG. 3C, among four sides of the almost quadrangular opening 240 of the case cover assembly 230, the upper side and a pair of lateral sides are formed by the body portion 231, and the remaining lower side is formed by the non-joining region 133a of the plate-like flange portion 133.

That is, in the present embodiment, the opening 240 is formed by and over both the coil assembly 100 and the case cover assembly 230. However, the opening 240 may not necessarily be thus formed in the present invention, and the entirety of the opening 240 may be formed by one of the coil assembly 100 or the case cover assembly 230.

The above-described cover end face extends with a uniform cross-sectional profile on the same plane in the peripheral direction. The cross-sectional profile includes a rib 40 that is almost inverse-U-shaped, and a flat and horizontal base portion 42, as shown in FIG. 4B. As described below in detail, the rib 40 is a longitudinal rib that projects from the base portion 42 in the axial direction, and is an example of "projection" in each of the above-described aspects.

FIG. 5 illustrates the cross-sectional structure of the cover end face in an enlarged manner as compared with FIG. 4B. As shown in FIG. 5, in the present embodiment, the cover end face has a tilted surface 44 to transition between the rib 40 and the base portion 42.

As shown in FIG. 5, when the cover end face is joined to the joining region 133b of the plate-like flange portion 133, the end face (R face) of the rib 40 of the cover end face comes into contact with the bottom surface 26 (flat face) of the recess 24 of the joining region 133b. At this time, the base portion 42 of the cover end face forms an air gap in the axial direction between the base portion 42 and the outer rib 20 of the joining region 133b.

That is, in the present embodiment, a recess-projection fitting portion at which the recess 24 formed in the plate assembly 130 and the rib 40 formed in the case cover assembly 230 fit each other is an example of the "contact portion". However, the recess 24 may be formed in the case cover assembly 230, and, similarly, the rib 40 may be formed in the plate assembly 130.

When the case cover assembly 230 is mounted so as to cover the plate assembly 130, the case cover assembly 230 and the plate assembly 130 are relatively moved close to each other in the axial direction, so that the rib 40 abuts with the tilted surface 28. Then, the rib 40 is guided radially inward due to the force converting effect of the tilted surface 28, to automatically fit the recess 24. That is, the centering function is exerted.

At this time, further movement (overrun) of the rib 40 is effectively inhibited by the inner rib 22 having a height that is greater than that of the outer rib 20 because the rib 40 cannot easily move over the inner rib 22. As a result, the case cover assembly 230 can be mounted so as to cover the plate assembly 130 more stably as compared with a case where the tilted surface 28 is not formed or the inner rib 22 has a height that is less than that of the outer rib 20.

The shape of the end face of the rib 40 and the shape of the bottom surface 26 of the recess 24 are considered. In the present embodiment, the end face of the rib 40 is formed as a curved surface forming a semi-spherical shape, whereas the bottom surface 26 of the recess 24 is formed as a flat surface. As a result, the rib 40 and the recess 24 engage with each other so as to be in point contact with each other in each cross-sectional view and so as to be in line contact with each other as a whole.

Based on the principle of laser welding, heat generated in the rib 40 is transmitted to the recess 24 through the surface on which the rib 40 and the recess 24 are in contact with each other, to cause heating and melting. The wider the contact surface on which each of the rib 40 and the recess 24 is in contact with the other thereof is, the greater the melting by laser light is, so that the strength for joining the rib 40 and the recess 24 to each other is expected to be enhanced.

Furthermore, in a case where the end face of the rib 40 has a semi-spherical shape, even slight melting of the end face causes reduction of the height dimension of the rib 40. Thus, in the rib 40, its height dimension changes sensitively relative to a small amount of melting. Meanwhile, change of the height dimension of the rib 40 causes change of the relative position, in the axial direction, between the case cover assembly 230 and the plate assembly 130, and, thus, the change of the height dimension is preferably minimized.

Thus, in the present embodiment, both the end face of the rib 40 and the bottom surface 26 of the recess 24 may be formed as flat surfaces. As a result, the rib 40 and the recess 24 may engage with each other so as to be in line contact with each other in each cross-sectional view and so as to be in surface contact with each other as a whole.

<Tool 60 for Laser Welding>

Figure 6:
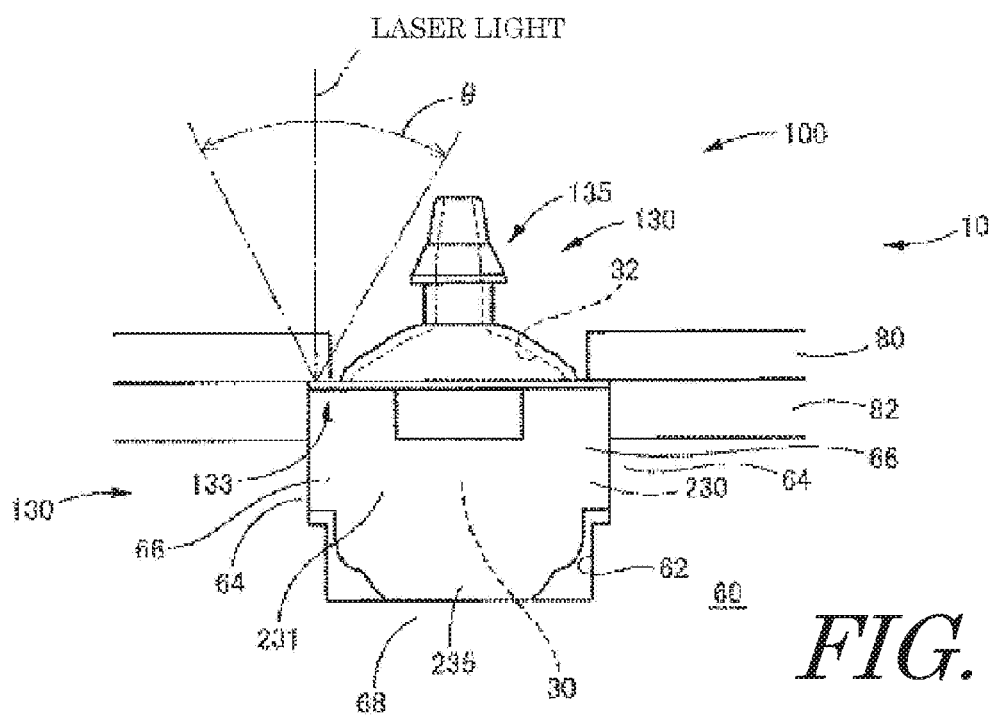
FIG. 6 is a cross-sectional view of the case cover assembly, shown in FIGS. 3A and 3B, which has been positioned in the recess of a tool and the coil assembly, shown in FIG. 2, which has been positioned on the case cover assembly having been positioned.

FIG. 6 is a cross-sectional view of an example of a tool 60 for the laser welding. The tool 60 has a recess 62 for positioning the case cover assembly 230 such that the above-described cover end face is oriented upward. The material of the tool 60 is a material which is not melted even when laser light is applied. For example, the material of the tool 60 is metal.

The inner surface of the recess 62 has at least a pair of parallel vertical wall portions (lateral direction positioning portions) 64, 64. The parallel vertical wall portions 64, 64 come into surface contact with the outer surfaces of a pair of parallel vertical walls (vertical flat portions) 66, 66 of the peripheral wall portion of the body portion 231 in the case cover assembly 230. Furthermore, the inner surface of the recess 62 has a horizontal bottom surface (up-down direction positioning portion) 68, and the bottom surface 68 comes into surface contact with the outer surface of the closing portion (horizontal flat portion) 235 of the case cover assembly 230. Each of the parallel vertical wall portions (lateral direction positioning portions) 64, 64 and the bottom surface (up-down direction positioning portion) 68 extend so as to be orthogonal to each other as viewed from the side.

As a result, the recess 62 three-dimensionally positions the case cover assembly 230 relative to a not-illustrated laser light source in conjunction with the pair of parallel vertical wall portions 64, 64 and the bottom surface 68, and simultaneously fixes the orientation of the case cover assembly 230 such that the case cover assembly 230 does not freely rotate (rotate on the horizontal face) or tilt (rotate on the vertical face).

In the present embodiment, the combined body of the coil assembly 100 and the case cover assembly 230 (before laser welding) is set in the tool 60, and the combined body is thereafter fixed to the tool 60. A pressing unit is used for fixing the combined body. The pressing unit includes, for example, a pressing plate 80 and a spacer plate 82.

The pressing plate 80 is brought into contact with the outer surface of the plate-like flange portion 133 of the plate assembly 130 from the upper side in order to press and fix the combined body against the tool 60 from the upper side.

The pressing plate 80 presses the combined body against the tool 60 from the upper side under pressure. In a case where laser light cannot be prevented from being incident on the pressing plate 80 during the laser welding, the material of the pressing plate 80 is a material through which the laser light is transmitted and which is unlikely to be heated and melted by the incident laser light. For example, the material of the pressing plate 80 is synthetic resin similarly to the plate assembly 130.

In the pressing plate 80 which is in contact with the plate-like flange portion 133, there is a limit to increase the plate thickness for enhancing bending rigidity of the pressing plate 80 while the pressing plate 80 in a cantilevered state is brought in contact with the plate-like flange portion 133. Therefore, the pressing plate 80 cannot press, by itself, the plate-like flange portion 133 with sufficiently high force.

Therefore, in the present embodiment, in a state where the pressing plate 80 is in contact with the plate-like flange portion 133, the spacer plate 82 is inserted between the pressing plate 80 and the tool 60 so as to fill a gap formed between the one face of the pressing plate 80 and the surface of the tool 60 with a rigid material. Since laser light is required to be not incident on the spacer plate 82 and bending rigidity is required to be maximized, the material of the spacer plate 82 is, for example, metal.

The tool 60 and the pressing unit can be implemented in various other modes. Two other examples will be described below with reference to FIG. 9 and FIG. 10. The components common to those in the example shown in FIG. 6 will be denoted by the same reference characters or terms, and repeated description is omitted.

Figure 9:
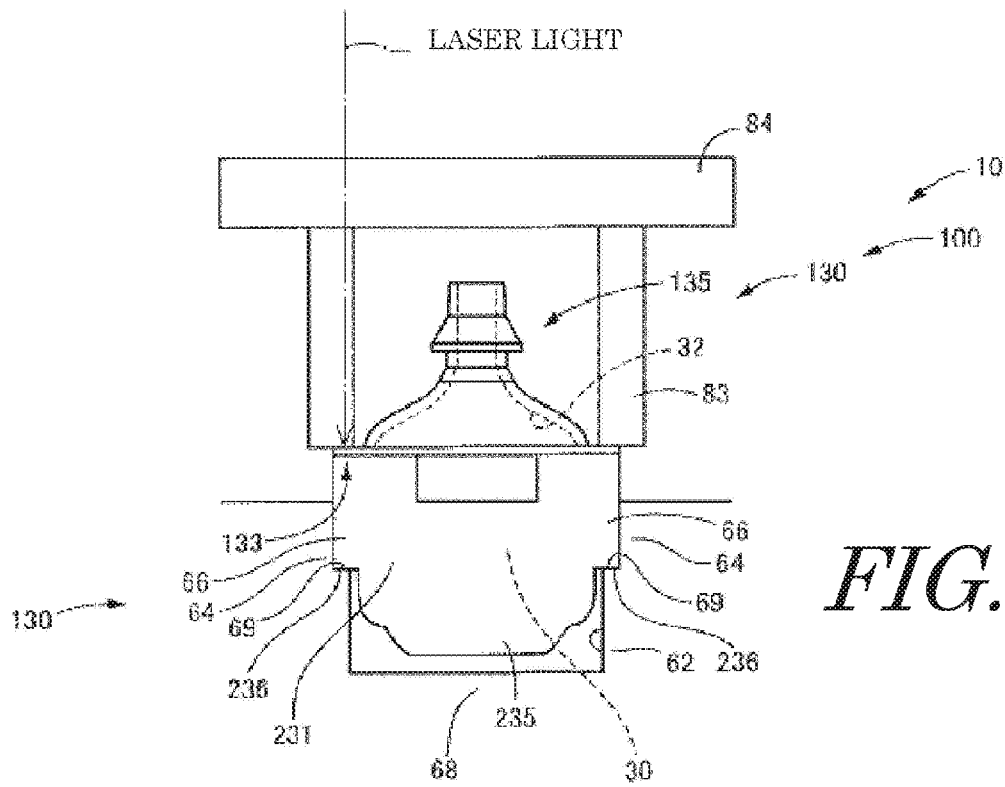
FIG. 9 is a cross-sectional view of an example of a tool which is different from the example shown in FIG. 6.

In the tool 60 used in the example shown in FIG. 9, the case cover assembly 230 is positioned in the vertical direction by using a stepped face 69 that faces upward, instead of the bottom surface 68. The stepped face 69 supports the downward-facing surface of a flat-plate-like outer edge (plate-like flange portion) 236 of the closing portion 235 in the case cover assembly 230 from the lower side.

Furthermore, the pressing unit used in the example shown in FIG. 9 includes a pressing tube (hollow shaft member) 83 made of a transmissive rigid material (for example, glass), and a pressing plate 84 made of a transmissive rigid material (for example, glass). The pressing tube 83 is oriented so as to extend in the vertical direction when used. The lower end surface of the pressing tube 83 is abutted with the upward-facing surface (including a target laser light incident region that opposes the joining region 133b) of the plate-like flange portion 133, and is in contact with the upward-facing surface over almost the entire periphery. The pressing tube 83 is pressed toward the tool 60 by the pressing plate 84 on the opposite end surface.

In the example shown in FIG. 9, during the laser welding, laser light is transmitted through the pressing plate 84 and the pressing tube 83 in order, respectively, and is incident on the target laser light incident region on the inner surface (surface on the side on which the cup-shaped portion 135 is disposed) of the plate-like flange portion 133.

Figure 10:
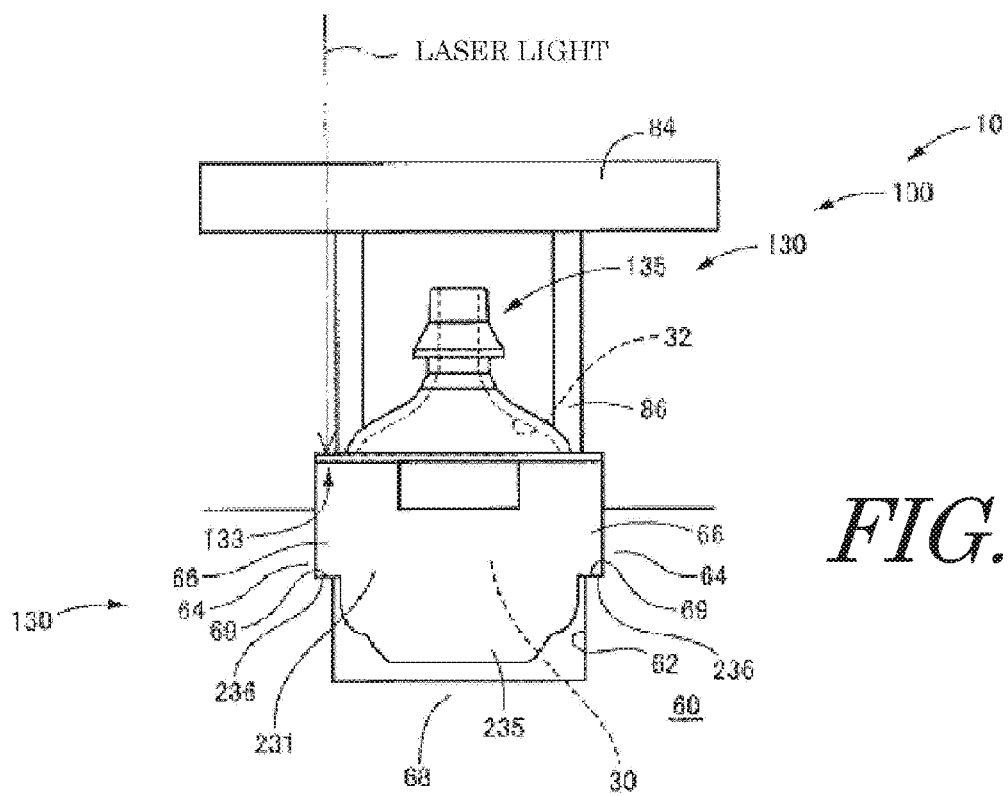
FIG. 10 is a cross-sectional view of another example of a tool which is different from the example shown in FIG. 6.

The tool 60 used in the example shown in FIG. 10 is similar to the example shown in FIG. 9 in that the case cover assembly 230 is positioned in the vertical direction by using the stepped face 69 that faces upward, instead of the bottom surface 68. Furthermore, the example shown in FIG. 10 is similar to the example shown in FIG. 9 in that the pressing unit used in the example shown in FIG. 10 includes a pressing tube (hollow shaft member) 86 and the pressing plate 84.

However, the pressing tube 86 shown in FIG. 10 is different from the pressing tube 83 shown in FIG. 9 in that the lower end face of the pressing tube 86 is abutted with a first portion, of the upward-facing surface (the inner surface) of the plate-like flange portion 133, which does not include the target laser light incident region, and a second portion (annular region), of the outer surface of the cup-shaped portion 135, which is adjacent to the first portion (in another example, is abutted with only the outer surface of the cup-shaped portion 135).

Therefore, in the example shown in FIG. 10, during the laser welding, although laser light is transmitted through the pressing plate 84, the laser light is incident on the target laser light incident region of the inner surface of the plate-like flange portion 133 without transmitting through the rigid tube 86.

Therefore, the pressing tube 86 shown in FIG. 10 is different from the pressing tube 83, shown in FIG. 9, of which the material is limited to a transmissive rigid material in that the pressing tube 86 shown in FIG. 10 may be formed of a transmissive rigid material, or may be formed of a non-transmissive rigid material (for example, metal having a rigidity higher than that of synthetic resin).

In the examples shown in FIG. 6 and FIG. 9, laser light needs to be transmitted through a member other than the ignition coil 10 just before the target laser light incident region. Therefore, during the laser welding, a substance (for example, smoke) generated from a portion around the joining region 133b may be adhered to the other member to lower the laser light transmittance.

Meanwhile, in the example shown in FIG. 10, laser light is not transmitted through the pressing tube 86 just before the target laser light incident region. As a result, during the laser welding, even in a case where a substance (for example, smoke) generated from a portion around the joining region 133b is adhered to the pressing tube 86, laser welding is not adversely affected.

Figure 7:
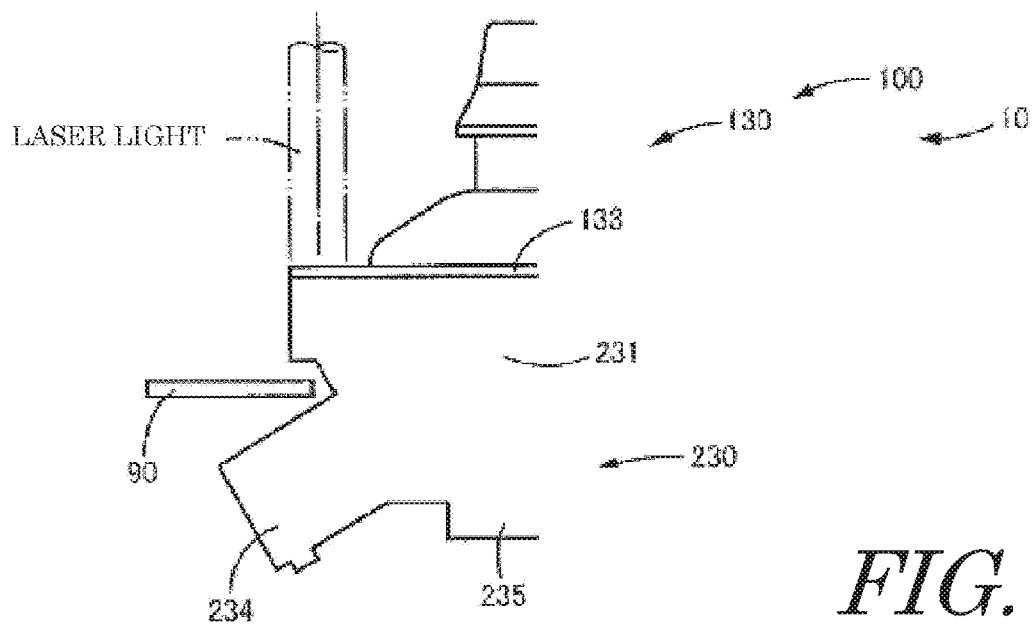
FIG. 7 is a side view of a shield that allows laser light incident on the coil assembly to reach a target portion in the case cover assembly but does not allow the laser light to reach a portion at which application of the laser light is adverse, in a positioned state shown in FIG. 6.

FIG. 7 is a side view of a shield 90 that allows laser light incident on the plate-like flange portion 133 of the plate assembly 130 to reach a target portion (the joining portion, a recess-projection fitting portion between the recess 26 and the rib 40) of the case cover assembly 230 but does not allow the laser light to reach a portion at which application of the laser light is adverse, in the positioned state shown in FIG. 6, FIG. 9, or FIG. 10.

In the case cover assembly 230, a portion on which laser light is incident during the laser welding and at which the incident laser light is adverse is the connector 234. Therefore, in the present embodiment, the shield 90 through which laser light is not transmitted is disposed between the connector 234 and the light path for the laser light. The material of the shield 90 is a material through which laser light is not transmitted. For example, the material is metal.

<Method for Applying Laser Light>

After the combined body has been set in the tool 60, laser light is applied to the joining portion (target portion) between the plate-like flange portion 133 and the case cover assembly 230, as shown in FIG. 5. As a method for applying or projecting laser light (laser beam) to the joining portion, for example, a scan method, a galvano-method, and a flash method are used.

In the scan method, a laser head for emitting laser light is moved relative to the joining portion in the peripheral direction of the joining portion, and, thus, the entire region of the joining portion is sequentially scanned in the peripheral direction at a spot of laser light applied to the joining portion at each moment.

In the galvano-method, laser light emitted from a laser head that is fixedly disposed is applied to the joining portion while a light path for the laser light is deflected by using a deflector such as a movable mirror, and the entire region of the joining portion is sequentially scanned at spots of laser light in the peripheral direction.

In the flash method, a plurality of laser light emitting portions (for example, laser head, emission optical system, or the like) are arrayed along the joining portion in the peripheral direction, and the laser light emitting portions are sequentially enabled in the peripheral direction or the laser light emitting portions are simultaneously enabled, to finally apply laser light to the entire region of the joining portion.

In the present embodiment, any of these methods may be used for the laser welding or another method may be used for the laser welding.

<Structure of Laser Welded Portion>

As a result of the laser welding, a laser welded portion is formed at the joining portion so as to extend in the peripheral direction. The laser welded portion is formed as, for example, a continuous line (in the present embodiment, almost C-shaped or U-shaped curved line) on which the welded region is continuous. In the laser welded portion, the plate assembly 130 and the case cover assembly 230 are joined in an airtightly sealed state. Therefore, for example, a waterproofing property of the ignition coil 10 is enhanced.

Instead thereof, the laser welded portion may be formed as an intermittent line on which welded regions and non-welded regions alternate. In this case, in the non-welded region, an air gap which is a gap, between the components, having been originally formed since joining of the assemblies 130 and 230 is substantially maintained as it is between the bottom surface 26 of the recess 24 of the plate-like flange portion 133 in the plate assembly 130 and the end face of the rib 40 in the case cover assembly 230.

More specifically, in a case where the scan method or the galvano-method is adopted, the on-off control of the laser head is performed along the joining portion, in the peripheral direction, between the plate assembly 130 and the case cover assembly 230, that is, along the scan path. Thus, welded portions which have changed from the joining portion by application of the laser light repeatedly alternate with joining portions that have been left due to the laser light having not been applied, that is, with non-welded portions.

In the present embodiment, after the plate assembly 130 and the case cover assembly 230 have been joined to each other by laser welding, insulating resin is injected through the opening 240 into the storage spaces 30, 32 and hardened so as to expel air as gas from the internal space of the combined body of the plate assembly 130 and the case cover assembly 230, that is, expel air from gaps that are the storage spaces 30, 32 and are not filled with another component, and to fill the gaps with the insulating resin instead of air.

In a case where air as gas is in the storage spaces 30, 32 or the insulating resin before the injection, it is important to inject the insulating resin into the storage spaces 30, 32 such that the gas is completely expelled from the storage spaces 30, 32 or the insulating resin when the insulating resin is injected.

Meanwhile, the operation condition of the laser welding can be set such that the air gap has such a size and/or a shape as to act as a degassing portion that allows gas having been originally in the storage spaces 30, 32 or the insulating resin to pass therethrough but does not allow the insulating resin to pass therethrough.

Specifically, the length dimension, the width dimension, the shape, and the like of each of a plurality of air gaps aligned in line in the peripheral direction are optimized by optimizing a duty ratio (for example, a ratio of the length of on-time to the length of one on-off control cycle) in the on-off control for the laser head, whereby each air gap can be caused to preferably act as the degassing portion.

<Condition for Stabilizing Quality of Laser Welded Portion>

Figure 8A:
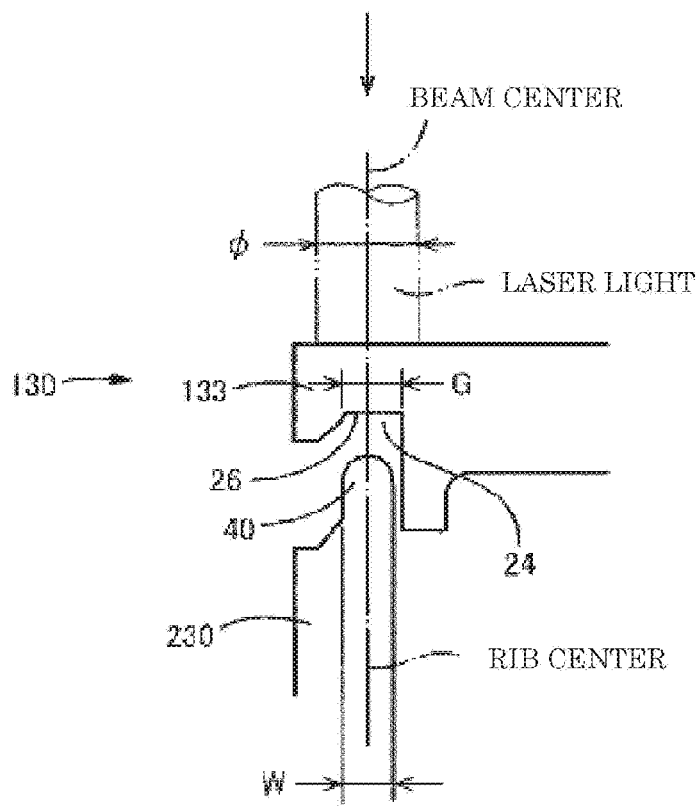
FIG. 8A is a partial cross-sectional view of a normal positional relationship between the recess and the projection shown in FIG. 5, and a light path for laser light.

FIG. 8A is a partial cross-sectional view of a normal positional relationship between the recess 26 and the rib (projection) 40, and the light path for laser light, which are shown in FIG. 5. In the normal positional relationship, the beam center of the laser light and the rib center that is the center line of the rib 40 coincide with each other.

In the present embodiment, a beam diameter φ of laser light is larger than a width dimension W (maximum value in the tolerance range) of the rib 40. Furthermore, the beam diameter φ of the laser light is larger than a groove bottom width dimension G (maximum value in the tolerance range) of the recess 26.

Figure 8B:
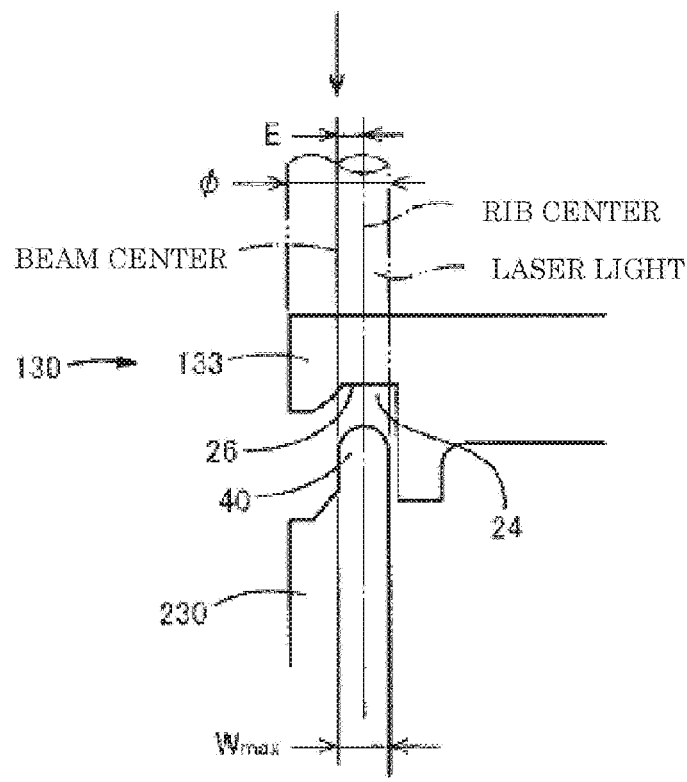
FIG. 8B is a partial cross-sectional view of an allowable-limit positional relationship between the recess and the projection, and a light path for laser light.

Meanwhile, FIG. 8B is a partial cross-sectional view of an allowable-limit positional relationship between the recess 26 and the rib 40, and the light path for laser light. In the allowable-limit positional relationship, the allowable range of a deviation E between the beam center and the rib center, and a tolerance range of the width dimension W of the rib 40 are selected such that the rib 40 (having a width dimension Wmax that is the maximum value in the tolerance range) does not deviate from the range of the beams of the laser light in the beam radially outward direction although the beam center of the laser light and the rib center that is the center line of the rib 40 do not coincide with each other.

As one example, the allowable range of the position error E between the beam center and the rib center, and the tolerance range of the width dimension W of the rib 40 are selected such that both the laser light and the rib 40 (having the width dimension Wmax that is the maximum value in the tolerance range) do not deviate in the radial direction beyond a range in which the beam outer peripheral face of laser light and the one of the inner peripheral surface and the outer peripheral surface of the rib 40 coincide with each other.

As one example, the width dimension W/the beam diameter φ is preferably not greater than 0.7, 0.6, or 0.5 for assuring the quality of the laser welding.

<Selection of Laser Light Path>

As described above, the ignition coil 10 according to the present embodiment has the following geometric characteristics. That is, as viewed from the side of the cup-shaped portion 135, 1) the outer surface of the cup-shaped portion 135 is tapered according to the outer surface of the cup-shaped portion 135 being farther from the outer surface of the plate-like flange portion 133 in the direction that is perpendicular to the outer surface of the plate-like flange portion 133, 2) the laser welded portion is disposed radially outward of the outer surface of the cup-shaped portion 135, and 3) the outer surface of the cup-shaped portion 135 is disposed radially inward of the outer peripheral edge of the plate-like flange portion 133.

Therefore, in a case where the light path for laser light is selected under the condition that the laser light is not transmitted through the cup-shaped portion 135, an angle range 8 that allows selection from among a plurality of options of the light paths for laser light is increased as compared with a case where, for example, a cylindrical portion is used instead of the cup-shaped portion 135. As a result, the light path for laser light can be more freely selected. This also facilitates enhancement of the quality of the laser welded portion.

However, in the present embodiment, the above-described laser welding can also be affirmatively performed in a manner in which laser light is transmitted through the cup-shaped portion 135.

<Specific Example of Laser Welding Method>

In the present embodiment, for the laser welding, the combined body (the coil assembly 100 and the case cover assembly 230) is firstly set in the tool 60. Next, the combined body is fixedly held by the tool 60 by using the pressing unit.

Subsequently, laser light is applied to the joining portion (the recess-projection fitting portion) of the combined body in any of the above-described three methods. As a result, the coil assembly 100 and the case cover assembly 230 are joined to each other at the laser welded portion. Thus, the ignition coil 10 is almost completed.

Thereafter, the insulating resin is injected into the ignition coil 10 as the semifinished product.

In the present embodiment, in a state where the coil assembly 100 and the case cover assembly 230 have been joined to each other, the respective internal spaces 32 and 30 are combined to form one combined internal space CIS (coil storage space). Therefore, in the present embodiment, the flowing insulating resin is injected through the opening 240 into the one combined internal space CIS.

In the present embodiment, another internal space 132 is in the combined internal space CIS as one storage space (coil storage space or coil positioning portion) formed by the partial cap 110 and the partial cap 131 which have been joined to each other, in conjunction with each other.

In the present embodiment, as described above, before the combined body is produced, the partial cap 110 is joined to and combined with the partial cap 131 which has been integrated with the plate assembly 130, to form a coil enclosing body. The internal space 132 is formed in the coil enclosing body.

The secondary coil 120 is inserted in the internal space 132. In this state, a part of the insulating resin is injected and filled in the internal space 132 in a vacuum state (a state in which degassing can be performed). That is, the first partial filling of ignition coil 10 with the insulating resin is performed. In other words, the secondary coil 120 is separately set in the ignition coil 10, and the secondary coil 120 is separately filled (impregnated) with the insulating resin.

Thereafter, the primary coil 210 is inserted and stored in the through hole 121 of the secondary coil 120. Furthermore, the outer peripheral cores 220, 221 are set around the secondary coil 120. Thus, the secondary coil 120, the primary coil 210, and the outer peripheral cores 220, 221 are positioned relative to the plate assembly 130.

Thereafter, the case cover assembly 230 is joined to the plate assembly 130 by the laser welding, to position the secondary coil 120, the primary coil 210, and the outer peripheral cores 220, 221 relative to the combined internal space CIS which can be formed by the joining of the case cover assembly 230 and the plate assembly 130.

Subsequently, a portion, of the combined internal space CIS, which is not occupied by the combined body of the partial cap 110 and the partial cap 131, the secondary coil 120, the primary coil 210, and the outer peripheral cores 220, 221 is filled with another part of the insulating resin. That is, the final filling of the ignition coil 10 with the insulating resin is entirely performed.

When an amount of the insulating resin injected into the combined internal space CIS has reached a target value, both the ignition coil 10 and the insulating resin are heated, so that the insulating resin (thermosetting resin) is hardened. Thus, the ignition coil 10 is fully completed.

In the present embodiment, as described above, the insulating resin is injected into the combined internal space CIS in a vacuum state (state in which degassing can be performed). Therefore, the insulating resin is not injected in a state where gas is in the combined internal space CIS. However, although gas is not in the combined internal space CIS, gas may have already be originally mixed in the insulating resin.

In this case, the flowing insulating resin is injected into the combined internal space CIS. Therefore, the insulating resin may be deformed or partially separated in the combined internal space CIS and gas in the insulating resin may be discharged into the combined internal space CIS.

At this time, as described above, since the laser welded portion between the plate assembly 130 and the case cover assembly 230 is formed as an intermittent line on which the welded regions and the non-welded regions alternate, in a case where some air gaps are formed between the end face of the plate assembly 130 and the end face of the case cover assembly 230, the air gaps function as vents to promote gas discharged into the combined internal space CIS from the insulating resin to be discharged to the outside through the gas vents. As a result, unnecessary gas is prevented from remaining in the combined internal space CIS in a preferable manner.

Although various embodiments of the present invention described in the following claims have been described above with certain specific implementations, a person skilled in the art can add multiple changes to the embodiments disclosed above without departing from the scope and gist of the present invention.

DESCRIPTION OF THE REFERENCE CHARACTERS

10 . . . ignition coil for internal combustion engine (ignition coil)
100 . . . coil assembly
130 . . . plate assembly (example of first partial case)
133b . . . joining region (example of laser welded portion)
230 . . . case cover assembly (example of second partial case)

The invention claimed is:

1. A method for producing an ignition coil for an internal combustion engine, the method comprising:
   a step A of disposing a primary coil and a secondary coil on a plate assembly to form a coil assembly;
   a step B of forming a case cover assembly having an internal space;
   a step C of welding the case cover assembly to the coil assembly by application of laser light so as to store the primary coil and the secondary coil in the internal space; and
   a step D of injecting insulating resin into the case cover assembly and the coil assembly welded to each other and hardening the insulating resin,
   wherein, in the step C, laser is applied such that portions which are welded by application of laser light and portions to which the laser light is not applied alternate in a joining portion between the case cover assembly and the coil assembly.

2. The method for producing the ignition coil, for an internal combustion engine, according to claim 1, wherein, in the step C,
   the laser light is applied so as to be substantially transmitted through the plate assembly and substantially absorbed by the case cover assembly.

3. The method for producing the ignition coil, for an internal combustion engine, according to claim 1, wherein an air gap that allows gas to pass therethrough but does not allow the insulating resin to pass therethrough is provided in the joining portion between the case cover assembly and the coil assembly.

4. An ignition coil for an internal combustion engine, the ignition coil comprising:
   a primary coil;
   a secondary coil;
   a plate assembly having a plate-like flange portion at which the primary coil and the secondary coil are disposed; and
   a case cover assembly that has an internal space for storing the primary coil and the secondary coil, the case cover assembly configured to be welded to the plate assembly,
   wherein the plate assembly is formed of synthetic resin,
   wherein the plate assembly is formed of the synthetic resin having a laser light absorptivity lower than that of the case cover assembly, and
   wherein portions which are welded by application of laser light and portions to which the laser light is not applied alternate in a joining portion between the case cover assembly and the coil assembly.

5. The ignition coil, for an internal combustion engine, according to claim 4, wherein a material of the plate assembly is PBT, and a material of the case cover assembly is a material in which a pigment containing a carbon material is added to PBT.

6. The method for producing the ignition coil, for an internal combustion engine, according to claim 2, wherein an air gap that allows gas to pass therethrough but does not allow the insulating resin to pass therethrough is provided in the joining portion between the case cover assembly and the coil assembly.

* * * * *